(12) United States Patent
Deguzman

(10) Patent No.: US 10,845,892 B2
(45) Date of Patent: Nov. 24, 2020

(54) SYSTEM FOR MONITORING A VIDEO

(71) Applicant: Pinterest, Inc., San Francisco, CA (US)

(72) Inventor: Lawrence Anthony Deguzman, San Mateo, CA (US)

(73) Assignee: Pinterest, Inc., San Francisco, CA (US)

( * ) Notice: Subject to any disclaimer, the term of this patent is extended or adjusted under 35 U.S.C. 154(b) by 0 days.

(21) Appl. No.: 15/798,031

(22) Filed: Oct. 30, 2017

(65) Prior Publication Data

US 2018/0052528 A1 Feb. 22, 2018

Related U.S. Application Data

(63) Continuation of application No. 14/964,163, filed on Dec. 9, 2015, now Pat. No. 9,804,690, which is a continuation of application No. 13/185,284, filed on Jul. 18, 2011, now Pat. No. 9,214,135.

(51) Int. Cl.
*G06F 3/03* (2006.01)
*G09G 5/14* (2006.01)
*G06F 3/033* (2013.01)
*G09G 5/30* (2006.01)

(52) U.S. Cl.
CPC .............. *G06F 3/033* (2013.01); *G09G 5/14* (2013.01); *G09G 5/30* (2013.01); *G09G 2340/02* (2013.01); *G09G 2340/0407* (2013.01); *G09G 2340/12* (2013.01); *G09G 2340/125* (2013.01); *G09G 2360/02* (2013.01); *G09G 2360/04* (2013.01); *G09G 2370/022* (2013.01); *G09G 2370/04* (2013.01); *G09G 2370/06* (2013.01)

(58) Field of Classification Search
None
See application file for complete search history.

(56) References Cited

U.S. PATENT DOCUMENTS

| 5,784,052 A * | 7/1998 | Keyson ................ G05G 9/047 345/163 |
| 6,118,427 A | 9/2000 | Buxton et al. |
| 6,633,310 B1 | 10/2003 | Andrew et al. |
| 6,981,227 B1 | 12/2005 | Taylor |
| 8,091,103 B2 | 1/2012 | Cope |
| 2003/0098869 A1* | 5/2003 | Arnold ............. H04N 21/23418 345/589 |
| 2008/0111822 A1* | 5/2008 | Horowitz ........... H04N 5/44591 345/530 |
| 2008/0195969 A1* | 8/2008 | Brown ................. G06F 3/0486 715/802 |
| 2008/0209480 A1 | 8/2008 | Eide et al. |
| 2008/0281689 A1 | 11/2008 | Blinnikka et al. |
| 2010/1123398 | 1/2010 | Brown et al. |
| 2010/0269030 A1 | 10/2010 | Dugonjic et al. |
| 2011/0032272 A1* | 2/2011 | Noritake .................. G06F 3/14 345/629 |
| 2011/0102456 A1* | 5/2011 | Avagyan ................ G09G 5/02 345/619 |

* cited by examiner

*Primary Examiner* — Saptarshi Mazumder
(74) *Attorney, Agent, or Firm* — Athorus, PLLC

(57) ABSTRACT

A computer-implemented method monitors a video-based graphic. The method includes displaying a video-based graphic. A position of a pointer interaction is monitored. The method includes determining a designation of a pixel of the video-based graphic at a location of the pointer interaction. An action is performed based on the designation of the pixel of the video-based graphic at a location of the pointer interaction.

21 Claims, 9 Drawing Sheets

SYSTEM FOR MONITORING A VIDEO

CROSS REFERENCE TO RELATED APPLICATIONS

This application is a continuation of U.S. patent application Ser. No. 14/964,163, filed Dec. 9, 2015, now issued as U.S. Pat. No. 9,804,690, and titled "System for Monitoring a Video," which is a continuation of U.S. patent application Ser. No. 13/185,284, filed Jul. 18, 2011, now issued as U.S. Pat. No. 9,214,135, and titled "System for Monitoring a Video," both of which are hereby incorporated by reference in its entirety.

TECHNICAL FIELD

The present description relates generally to a system and method, generally referred to as a system, for monitoring a video.

BACKGROUND

A market exists for the distribution of media content, advertising, and other information over data communications and entertainment networks. A non-limiting example is the insertion of advertising copy supplied by advertisers, for appearance on web pages, content offered by media distributors such as news and information services, internet service providers, and suppliers of products related to the advertiser's products or services.

Digital media offers online providers, content providers, and/or marketers or advertisers a rapid, highly targeted, interactive, measurable and cost effective route to target users and/or consumers. Hundreds of millions of websites and huge volumes of online content and/or advertising are communicated around the world every day. With huge volumes of webpages being created, bringing with them a similar surge of new inventory, many online publishers, content providers, and/or marketers or advertisers may seek ways to provide interactive content and/or advertisements to users.

SUMMARY

A computer-implemented method monitors a video-based graphic. The method includes displaying a video-based graphic. A position of a pointer is monitored. The method includes determining a transparency of the video-based graphic at a location of the pointer. An action is performed based on the determined transparency of the video-based graphic at a location of the pointer.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

The use of graphics and animations, such as with advertisements or content displayed, may provide a visually engaging experience for a user. In some circumstances, online providers may gain revenue from the sale of opportunities for the placement of graphics and/or animations with content requested by a user. For example, an online provider may sell advertising space in the form of opportunities for the placement of graphics and/or animations to one or more advertisers. Accordingly, online providers and/or advertisers may wish to maximize the effectiveness and ease of interaction with graphics and/or animations placed with the content requested by a user. An advantage of including video-based graphics, vector-based graphics, Flash animations, and pixel-based graphics may be that these types of graphics and/or animations may be visually stimulating and/or engaging, may quickly capture the interest of a user, and/or may be configured so as to present a temporary intrusion into the user's requested content which may be removed.

Figure 1:
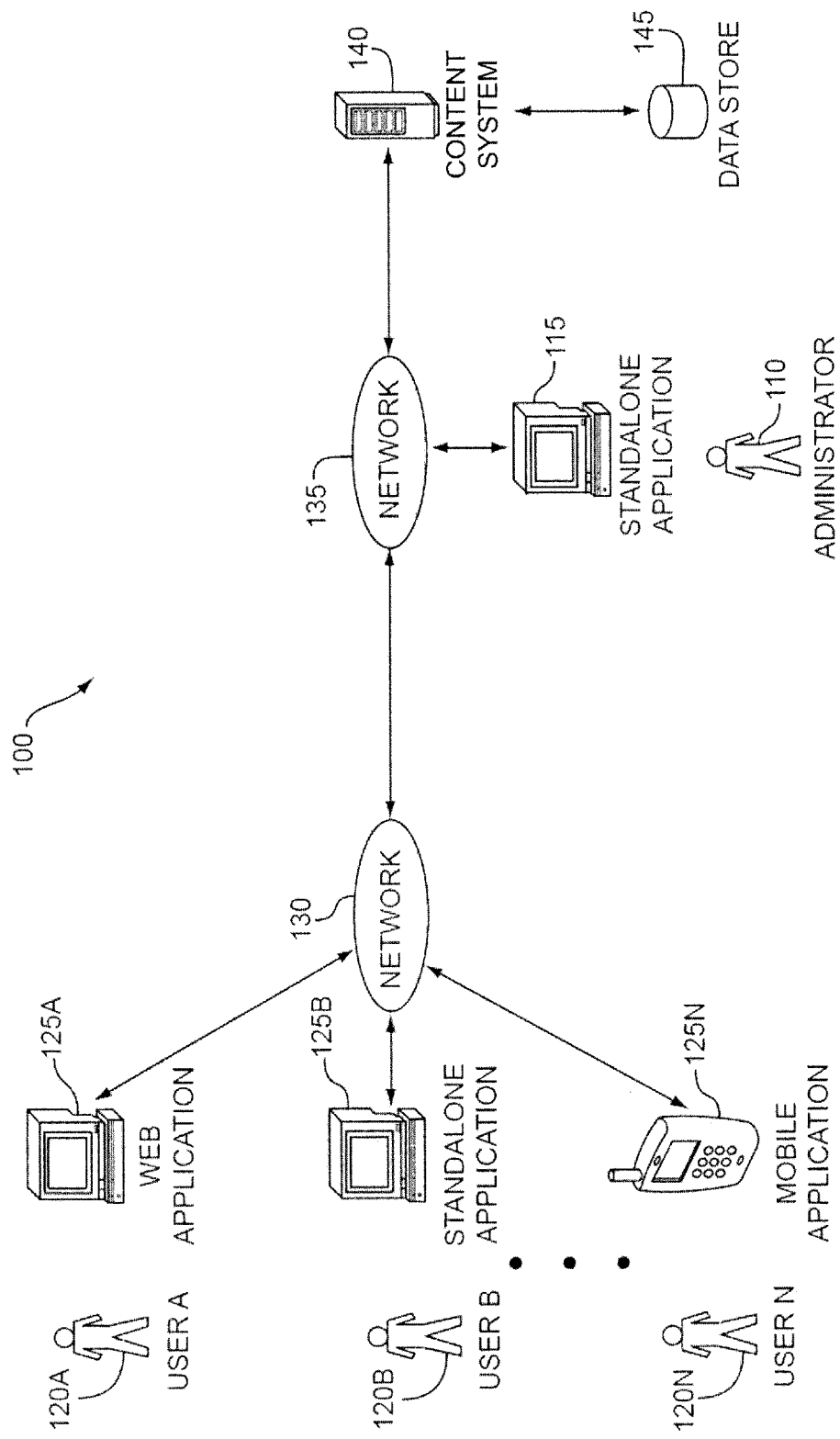
FIG. 1 is a block diagram of a general overview of a network environment and system for content and advertisement management and delivery.

FIG. 1 provides a simplified view of a network environment 100 for managing and serving or delivering content and/or advertisements to users and/or consumers ("users"). Not all of the depicted components may be required, however, and some implementations may include additional components not shown in the figure. Variations in the arrangement and type of the components may be made without departing from the spirit or scope of the claims as set forth herein. Additional, different or fewer components may be provided.

The network environment 100 may include an administrator 110 and one or more users 120A-120N with access to one or more networks 130, 135, and one or more web applications, standalone applications, mobile applications 115, 125A-125N, which may collectively be referred to as client applications. The network environment 100 may also include one or more content systems 140, and/or one or more related data stores 145.

The networks 130, 135 may include wide area networks (WAN), such as the Internet, local area networks (LAN), campus area networks, metropolitan area networks, or any other networks that may allow for data communication. The network 130 may include the Internet and may include all or part of network 135; network 135 may include all or part of network 130. The networks 130, 135 may be divided into sub-networks. The sub-networks may allow access to all of the other components connected to the networks 130, 135 in the system 100, or the sub-networks may restrict access between the components connected to the networks 130, 135. The network 135 may be regarded as a public or private network connection and may include, for example, a virtual private network or an encryption or other security mechanism employed over the public Internet, or the like.

The web applications, standalone applications and mobile applications 115, 125A-125N may be connected to the network 130 in any configuration that supports data transfer. This may include a data connection to the network 130 that may be wired or wireless. Any of the web applications, standalone applications and mobile applications 115, 125A-125N may individually be referred to as a client application.

The web application 125A may run on any platform that supports web content, such as a web browser or a computer, a mobile phone, personal digital assistant (PDA), pager, tablet, notebook, network-enabled television, digital video recorder, such as TIVO®, automobile and/or any appliance or platform capable of data communications.

The standalone application 125B may run on a machine that includes a processor, memory, a display, a user interface and a communication interface. The processor may be operatively connected to the memory, display and the interfaces and may perform tasks at the request of the standalone application 125B or the underlying operating system. The memory may be capable of storing data. The display may be operatively connected to the memory and the processor and may be capable of displaying information to the user B 125B. The user interface may be operatively connected to the memory, the processor, and the display and may be capable of interacting with a user B 120B. The communication interface may be operatively connected to the memory, and the processor, and may be capable of communicating through the networks 130, 135 with the advertisement system 140. The standalone application 125B may be programmed in any programming language that supports communication protocols. These languages may include: SUN JAVA®, C++, C #, ASP, SUN JAVASCRIPT®, asynchronous SUN JAVASCRIPT®, or ADOBE FLASH ACTIONSCRIPT®, ADOBE FLEX®, amongst others.

The mobile application 125N may run on any mobile device that may have a data connection. The data connection may be a cellular connection, a wireless data connection, an internet connection, a television connection, a cable connection, an infra-red connection, a Bluetooth connection, or any other connection capable of transmitting data. For example, the mobile application 125N may be an application running on an APPLE IPHONE®.

The content system 140 may exist on one machine or may be running in a distributed configuration on one or more machines. A part or all of the content system 140 may be in communication with the client applications 115, 125A-125N, such as over the networks 130, 135. For example, the content system 140 may provide an interface to the users 120A-120N through the client applications 125A-125N, such as a user interface for inputting search requests and/or viewing web pages. Alternatively or in addition, the content system 140 may provide a user interface to the administrator 110 via the client application 115, such as a user interface for managing the data source 145 and/or configuring advertisements. The content system 140 may also be referred to as an advertising server, advertising system, and/or content server.

A user, such as any of users 120A-120N, may request content and/or pages, such as web pages, via the web application, standalone application, mobile application 125A-125N, such as web browsers. For example, a user 120A may enter a URL, click on a hyperlink, and/or otherwise access a web page, which may, for example, be provided by an online provider.

The user's request for content may be received, processed, and/or responded to, such as by the content system 140. The content system 140 may access, gather, and/or send to the user the content requested by the user ("requested content"). In some systems, the content requested by the user may be stored in the data store 145 and/or in the content system 140. In other systems, the content requested by the user may be located and/or stored remotely from the content system 140 and the data store 145. Various other configurations are possible.

Additional media, content, information, and/or advertisements ("advertisements") may be provided before, with, and/or in place of content, such as web pages, requested by users. Such advertisements may include, for example, a video, animation, image, vector-based graphic, video-based graphic, pixel-based graphic, jpeg, jpg, bitmap, pmg, text, and/or various other graphics or animations (which may collectively be referred to as "animated advertisements"). The advertisements may be, for example, an advertisement for an advertiser and/or a product or service offered by an advertiser. While the following description may refer to the additional media, content, information, and/or advertisements as 'advertisements,' it should be appreciated that this may include various other types of additional media, content, and/or information which may not be or include advertisements. For example, in some circumstances, a video uploaded by an author of textual content requested by a user may be placed over the textual content. In some systems, an animated advertisement may be selected based on a relationship between the animated advertisement and the content requested. Various other examples are possible.

Graphics and animations, such as animated advertisements, may be stored in, controlled by, and/or requested from the content system 140 and/or data store 145 to be served with the requested page. The content requested by the user may be configured, designed, adjusted, and/or otherwise modified to include or allow one or more graphics or animations to be included, inserted, served, and/or displayed to the user before, with, and/or in place of the requested content. In some systems, the content system 140 may configure and/or place the one or more animated advertisements with the requested content, and/or may serve the requested content and animated advertisements to the requesting user. In other systems, the content system 140 may merely transmit the requested content and the animated advertisement separately, such as to another component which may configure and/or arrange the requested content and/or animated advertisement and/or forward it to a user. In other systems, more than one content system 140 may be incorporated, and/or each of the more than one content system 140 may have the same or different tasks associated with the requested content and animated advertisements which may be performed. Various other configurations are possible.

One or more graphics or animations, such as an animated advertisement, may be provided to a user in various ways. For example, one or more graphic or animation may be displayed on top, overlaying, and/or floating over the requested content, such as a floating animation and/or floating advertisement. In some systems, the underlying requested content may be dimmed, faded, blurry, and/or otherwise distorted to draw the attention of the user to the graphic or animation playing over the requested content. In other systems, the underlying requested content may be unaltered. In other systems, one or more graphics or animations may be placed in one or more defined places on a web page, such as a banner advertisement placed along a top portion of a requested web page. Various other placements and/or displays of graphics or animations are possible.

In some network environments 100, a bandwidth detector (also referred to as a bandwidth snipper) may be incorporated, though this may not be required. The bandwidth detector may identify and/or detect a bandwidth and/or connection of a user. The bandwidth detector may determine whether or not a user's connection is greater than a threshold or not. The determinations from the bandwidth detector may be used to determine whether or not to serve certain content, such as large video-based graphics, to the user.

A graphic or animation, such as an animated advertisement, may be created and/or displayed in various formats and ways. For example, an animated advertisement may be created and/or include vector-based graphics, such as scalable vector graphics ("svg") and encapsulated postscript ("eps") vector graphics. Vector-based graphics may be or include a collection of points, lines, and/or data. The vector-based graphics may instruct and/or specify a position of one or more lines. The vector-based graphics may instruct and/or specify how a point and/or graphic may move through a line. The vector-based graphics may create one or more irregular shapes which may be capable of moving through or across a screen, such as over a web page or other content requested by a user.

Vector-based graphics may be used, for example, to create a regular and/or irregular shape which may itself float across, be displayed on top of, or otherwise overlay content requested by a user. For example, a vector-based race car may be configured and/or designed to drive across a screen and/or across a display of content requested by a user. As another example, a vector-based butterfly may flutter across or around a screen and/or display of content requested by the user. Various other examples of vector-based graphics are possible.

The vector-based graphic may have a boundary which may, for example, be and/or be around the regular or irregular shape. For example, a vector-based race car may have a boundary around and/or in the shape of the race car, or a vector-based butterfly may have a boundary around and in the shape of the butterfly.

Video-based graphics may also be used and/or incorporated with animated advertisements. Video-based graphics may differ from vector-based graphics in various ways. Video-based graphics may be and/or include a video or video animation, Flash video files or media such as FLV's or F4V's, and/or various other video or video-based animations. The video-based graphics may be and/or include a rectangular or other outer boundary and/or shape, such as a shape of a video animation typically shown on a television, computer, PDA, phone, movie theater, and/or various other devices.

Video-based graphics may be modified, altered, and/or otherwise changed. For example, video-based graphic may be modified so as to make a portion of the video transparent, such as to give the illusion that the video is a vector graphic and/or is only a portion of the video. For example, a video of a race car may be digitally or otherwise altered so that the sky, road, and/or background are made transparent and visually removed from the video. In this example, only the race car may opaque and/or visible. Various other examples are possible. A modified, altered, and/or otherwise changed video-based additional media, content, and/or information may resemble and/or appear similar to a vector-based graphic. Other shapes and/or boundaries of video-based graphics are possible. Other examples of graphics and animations, such as images and/or various other animated displays, are possible.

In some instances, creation and display of video-based graphics may be advantageous over vector-based graphics in that a video-based graphic may not require the configuration and/or manipulation of lines and data points that are needed with vector-based graphics. Editing a video-based graphic to make portions of one or more frames of a video-based graphic transparent may be much easier and faster than creating the same visual effect using vector-based graphics. However, in some systems, a video object such as a flash video, may be seen and/or interpreted by a mouse and/or processor as one rectangular object with no differentiation or distinction between transparent and opaque pixels. A video pointer aware class may be used to monitor a video and/or video-based graphic. The video pointer aware class may identify and/or provide a differentiation or distinction between transparent and opaque pixels in a video-based graphic.

Figure 2:
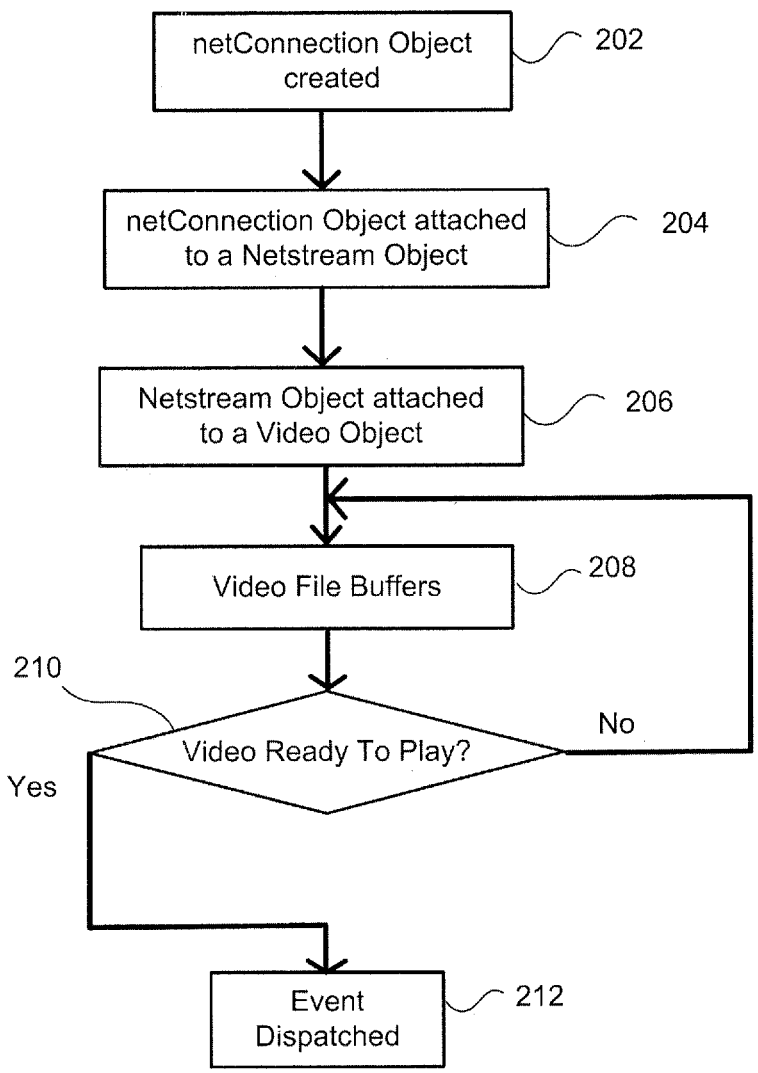
FIG. 2 is a flow diagram of a method of displaying a video-based graphic.

FIG. 2 is a block diagram of an example method for receiving and/or playing a video-based graphic, such as an animated advertisement. The method of FIG. 2 may be implemented, such as in or with a user device, when a video, such as a video-based graphic and/or animated advertisement, is being played and/or displayed to a user. This method may be used during, for example, playing and/or displaying a video-based graphic, such as an animated advertisement, along with and/or at the same time as the requested content.

The method may begin at block 202. A user device and/or one or more components of the user device may create and/or generate a netConnection object. For example, the netConnection object may be created by a Netstream class, such as a custom Netstream class, or various other classes. The netConnection object may, for example, create a connection to a server that stores and/or transmits the video to be played and/or displayed. The netConnection object may, for example, function like or resemble a conduit through which information may be passed to the device.

At block 204, the netConnection object may attach to and/or be attached to a Netstream object. The netConnection object may be attached to the Netstream object, for example, by the Netstream class. The Netstream object may, for example, allow the user device to stream the video. The Netstream object may, for example, accommodate a streaming of the video in real-time or near real-time.

At block 206, the Netstream object may attach to and/or be attached to the video object. The Netstream object may be attached to the video object, for example, by the Netstream class. The video object may be used to display and/or play the video and/or video-based advertisement to the user device. The video object may be, for example, a part or included with a television, computer screen, display screen, and/or various other objects that may take information from the Netstream object and render or display this information. Other variations are possible.

At block 208, the video file buffers and/or begins transmitting to and/or through the Netstream object and/or the user device to the video object. At block 210, if the video is not ready to play, the method returns to block 208 and the video file continues to buffer, as described. The video file may continue to buffer until enough of the video has been received and/or stored so that the video may be played. In some systems, a threshold may be set, above which the video may begin playing while the video file continues to download. The threshold may be set so that the video will play without interruptions, such as interruptions when not enough of the video file has been buffered to allow playback. In other systems, the threshold may be set in various other manners. In some systems, no threshold may be set.

If at block 210, the video is ready to play, the method may move to block 212. In some systems, the video may be considered and/or determined ready to play when the video has buffered enough to satisfy one or more conditions or thresholds. In some systems, the video may also or alternatively require certain guaranteed requirements, such as bandwidth requirements and/or guarantees from the transmitting server, in order for the video to be considered and/or determined ready to play. In other systems, the video may be considered and/or determined ready to play as soon as any video signal is received, regardless of an amount of the video that has been buffered. Various other considerations may be used to determine when a video is ready to play.

In block 212, when the video is ready to play and/or when the video begins to play, an event may be dispatched. The event may, for example, broadcast and/or megaphone to the rest of the programs and/or applications in communication with the system that the video is beginning to play.

Not all of the features or blocks of FIG. 2 may be required for the streaming and/or display of a video-based graphic. Various other steps and/or features may be included and/or substituted to the method.

In some systems, a user may interact with a graphic or animations, such as an animated advertisement, using one or more pointers, cursors, input devices, and/or various other devices. For example, in some systems, one or more input devices may have, include, be attached to, and/or control a pointer or cursor associated with the input device. As an example, a mouse may be attached to and/or used to control a pointer, such as an arrow or hand cursor displayed on a screen. As another example, a user may use a pen, finger, or stylus to manipulate and/or navigate a pointer or menu functions on a touchscreen. Various other examples of input devices and/or pointers are possible.

A user may use the one or more input devices and/or pointers in various ways. For example, a user may use an input device, such as a mouse, to position a pointer associated with the input device at a position or on a portion of a display. As another example, a user may use a pen, finger or stylus on a touchscreen to select and/or maneuver through one or more displays or menus. Various other examples are possible.

The user may interact with a graphic or animation in various ways. In some systems, a user or pointer interaction ("pointer interaction") may take place when a user clicks or presses a button, such as right- or left-clicking of a mouse, or taps on a screen with a finger or stylus. In some systems, the mere positioning and/or movement of the pointer may be or may be considered a pointer interaction. Other examples of user interactions may include a pointer click, a slide or drag of a pointer across a display, a hovering pointer, a voice-activated command, a button press, an activation of an actuator such as a key, button, or switch, and/or various other interactions.

In some systems, the location of a pointer and/or a pointer interaction may be important. For example, the location of a pointer may be important in systems where a response or action to be performed upon the identification or detection of a pointer interaction depends on the location of the pointer interaction.

Detecting, identifying, and/or monitoring a pointer interaction with a graphic, animation, and/or requested content may depend on the type of graphic, system, code, software, processing devices, and/or data used with or to create the graphic or animation. For example, detecting, identifying, and/or monitoring a pointer interaction with vector-based graphic may be different from and/or require different components, actions, and/or methods than detecting, identifying, and/or monitoring a user interaction with a video-based graphic.

A pointer interaction with a display that includes requested content and/or a vector-based graphic may be identified, tracked, detected, and/or monitored based on a boundary of the vector-based graphic. An interior of the boundary of the vector-based graphic may be opaque and/or include content which may be visible to the user, while nothing related to the vector-based graphic may be displayed outside of the boundary. As the vector-based graphic may be formed in various shapes, such as a regular and/or irregular shape, the vector-based graphic may be configured such that any interaction within a boundary of the vector-based graphic may be identified as a first type of interaction, and any interaction outside of the boundary of the vector-based graphic may be identified as a second type of interaction. For example, a pointer interaction within the boundary of a vector-based graphic may be identified as a first type of interaction which may be a positive and/or favorable interaction with the vector-based graphic, while any interaction outside of the boundary of the vector-based graphic may be identified as a second type of interaction which may be a neutral and/or negative interaction with the vector-based graphic. With vector-based graphics, a user interaction with the vector-based graphic may be identified, detected, and/or monitored using the vector-based rules and/or data about the vector-based graphic.

The pointer interaction with vector-based graphic may cause one or more actions to be performed. For example, when a user positively and/or favorably interacts with the vector-based graphic, such as, for example, by clicking on a vector-based advertisement displayed over a requested web site, further information and/or web-pages associated with the advertisement may be displayed to the user. As another example of an action performed based on a pointer interaction, where a user clicks on an open space, a close button, and/or on content behind a vector-based graphic, such as a vector-based advertisement, the graphic may disappear, and/or the user may be able to navigate through the requested content behind or below the graphic. Other possible actions are possible.

In some systems, the display of a graphic may require an interaction from a user to move past the graphic, remove the graphic, and/or to display further information or web-pages associated with the graphic. In other systems, the display of a graphic, such as the display of a graphical overlay of floating animations, may be temporary and be removed after a certain time. Various other examples of interactions and actions performed are possible.

As an example of a pointer interaction with a specific vector-based graphic, consider a vector-based graphic of a race care. A pointer interaction within a boundary of a vector-based race car may be identified as a positive and/or favorable interaction, which may be interpreted to mean that the user is interested in the subject matter of the vector-based graphic. The pointer interaction may cause additional information or a website about or associated with the race car or the sponsor of the race car may be displayed to the user. In contrast, a pointer interaction with an area outside the boundary of the vector-based race car may be identified as a neutral or negative interaction with the vector-based race car, indicating that the user may not be interested in the subject matter of the vector-based graphic. In this case, the vector-based race car may be removed from the display and/or closed. Alternatively, the vector-based race car may remain displayed, but the user may be able to access, scroll, and/or otherwise interact with the content below, behind, and/or underlying the vector-based race car, while the animation of the vector-based race car continues and/or finishes. Various other examples are possible.

In some situations, a video-based graphic may be visually similar and/or indistinct from a vector-based graphic. As such, a user may expect that an interaction with a video-based graphic may operate, function, and/or achieve the same result as an interaction with a vector-based graphic. However, identifying, monitoring, and/or detecting pointer interaction with video-based graphics may differ from vector-based graphics. For example, while a vector-based graphic may digitally and/or electronically be represented as an irregular shape, a video-based graphic may generally have a constant and/or unchanging shape, such as a rectangular box or other original shape or boundary of the video-based graphic. This may be true, even where the video-based graphic has been digitally altered so that portions of the video-based graphic appear transparent, and/or where the video-based graphic has been altered to resemble and/or replicate the visual image and/or effect of the vector-based graphic.

Accordingly, methods, systems, components, and/or features, such as a video pointer aware class and/or video aware overlay system ("video pointer aware class"), may be employed to identify, interpret, control, and/or monitor a pointer interaction with a video-based graphic, and/or determine an action to be performed based on the pointer interaction. A video pointer aware class may be used to determine a location of a pointer being operated by a user. The video pointer aware class may be configured and/or used to interpret a transparency or opacity (or opaqueness) of one or more portions and/or pixels of a video-based graphic. The video aware overlay may be able to determine the transparency or opacity of a video at the location and/or time that a user interacts with the video-based additional media, content, and/or information.

Figure 3:
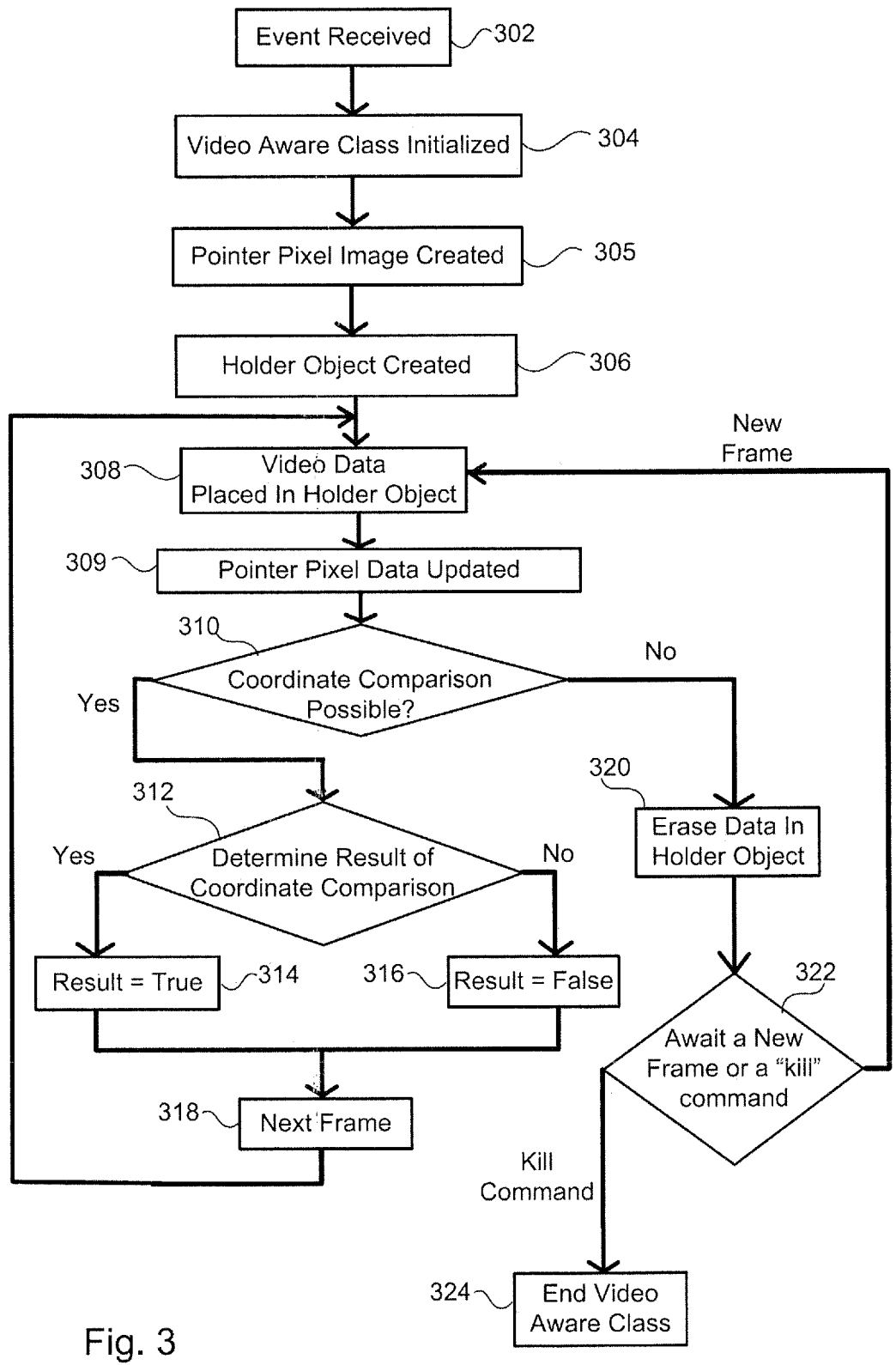
FIG. 3 is a flow diagram of a method of using a video pointer aware class with the display of a video-based graphic.

FIG. 3 illustrates one method of using a video pointer aware class with the display or play of a video-based graphic, such as the display of a video-based advertisement overlying or otherwise on top of requested content.

The method may begin at block 302 with the receipt of an event. The event may be or resemble the event dispatched in block 222 of the method in FIG. 2. The event may indicate that a video and/or video-based graphic, such as an animated advertisement, may be streaming and/or playing. The event may be received by a user device, such as the web application 125A, the standalone application 125B, and/or the mobile application 125N. In some systems, the user device may catch or capture the event that is dispatched.

After receiving the event, the method may proceed to block 304, where a video pointer aware class may be initialized and/or instantiated. For example, a constructor may be called which may construct and/or instantiate the video pointer aware class. One or more processors, software, code, and/or various other processing devices, such as a processor within the user devices or used by the content provider, may initialize, store, run, process, operate, and/or control a video pointer aware class.

In some systems, the video pointer aware class may remain dormant and/or turned off when not needed and/or when no video-based graphics are being played or displayed to a user. In these systems, the video pointer aware class may be activated and/or initialized upon receipt of the event indicating the playing of a video-based graphic. This may provide the advantage of saving processing and other resources that may be needed by the video pointer aware class until a need and/or use arises. In other systems, the video pointer aware class may always be initialized and/or operable. In these systems, receipt of the event at block 302 may merely notify and/or otherwise indicate to the system that the video pointer aware class may be used shortly.

Figure 4:
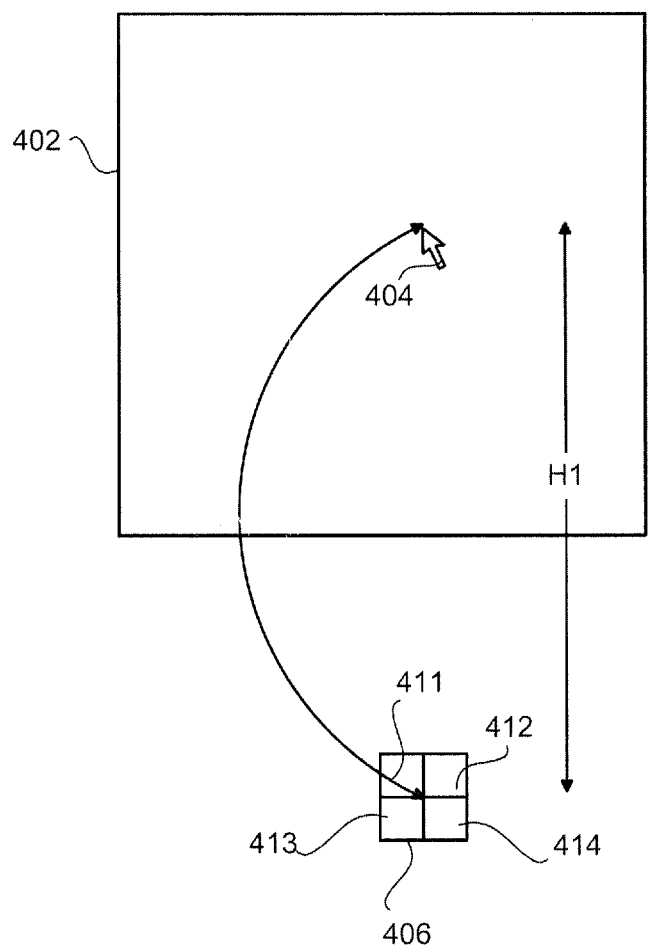
FIG. 4 is a diagram of a pointer and a pointer pixel image.

From block 304, the method may proceed to block 305, where a pointer pixel image may be created. FIG. 4 illustrates the generation of a pointer pixel image.

A display 402, such as a display, computer screen, television, tablet screen, phone screen, touch screen, various other displays or screens, and/or other visual image, space, and/or area which may be visible and/or shown to a user, may include one or more pointer 404. The pointer 404 may be, for example, a mouse pointer, keyboard indicator, touch-screen indicator or pointer, or various other pointers. In some systems, the pointer 404 may be connected to, attached to, controlled by, and/or otherwise manipulated using an input device. For example, the pointer 404 may be a mouse pointer which may be manipulated through the movement, buttons, and/or wheels of a mouse. In another example, the pointer 404 may be manipulated and/or moved through or on a touchscreen, such as with a pen, finger, or stylus. The pointer 404 may, for example, be used to maneuver, manipulate, and/or interact with a processor, web page, content displayed to a user, and/or various other computer or processor functions. Other examples are possible.

The video pointer aware class may create, import, and/or otherwise generate a pointer pixel image 406. The pointer pixel image 406 may be attached to a pointer 404. The pointer pixel image 406 may be associated with, mimic, and/or relate to the pointer 404.

The pointer pixel image 406 may be placed, located, and/or offset from the user's display 402 and/or from any video-based graphics displayed to the user. For example, the pointer pixel image 406 may be placed, located, and/or offset by a vertical, or y-coordinate, distance H1 from the location of the pointer 404. In some systems, H1 may be configured to be as long or longer than a height of the display 402, such that at any point within the display 402, the pointer pixel image 406 of the pointer 404 will be placed, located, offset outside of, and/or offstage from the display 402. Additionally or alternatively, the pointer pixel image 406 may be placed, located, and/or offset by horizontal distance from the pointer 404. Various other placements and/or locations of the pointer pixel image 406 are possible.

The pointer pixel image 406 of the pointer may be made up of pixels and/or may be various sizes. For example, the pointer pixel image 406 may be a 2×2 pixel (4 square pixels) image of the four square pixels 411, 412, 413, and 414. In other systems, more or less pixels may be used to create the pointer pixel image 406. Various other sizes and make-ups of the pointer pixel image 406 are possible.

The pointer pixel image 406 may be configured so that the position of the pointer 404, offset by the distance H1, represents the center of the pointer pixel image 406. As such, the four pixels 411, 412, 413, and 414 may each surround and/or touch the position of the pointer 404 offset by the distance H. Various other configurations are possible.

The pointer pixel image 406 may be updated continuously, at determined time intervals, and/or at or in conjunction with a new frame of a video and/or content display. Various other methods, timing, and/or update conditions are possible.

As shown in FIG. 4, in some systems, a pointer pixel image 406 may be created, generated, maintained, and/or updated at or after the initialization of a video pointer aware class. In some systems, a pointer pixel image 406 may only be created, generated, maintained, and/or updated during a time that a video pointer aware class is operating. However, it should be understood that in other systems, a pointer pixel image 406 may be created, generated, maintained, and/or updated at different times, separately from, and/or without associated with, the video pointer aware class. In some systems, for example, a pointer pixel image 406 may only be created, generated, maintained, and/or updated upon a detection or receipt of an indication of a user interaction, such as a mouse click. Various other configurations are possible.

Figure 5:
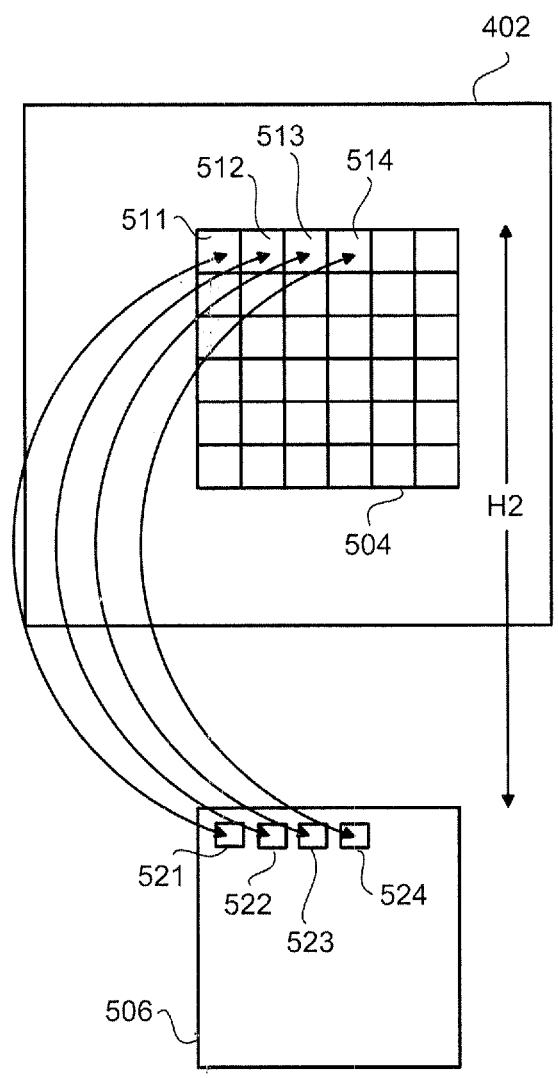
FIG. 5 is a diagram of a video-based graphic and a holder object with video data.

At block 306, a holder object may be created. At block 308, video data may be placed in a holder object. FIG. 5 illustrates the creation of a holder object and the placement of video data in the holder object.

A video-based graphic, such as the video-based graphic 504, may be located, played, and/or displayed within the display 402. The video-based graphic 504 may have a size and shape, such as the size and shape of the video from which the video-based graphic 504 has been created. The video-based graphic 504 may, for example, be or have a rectangular shape or various other shapes such as various shapes of video screens or files.

In some systems, the video-based graphic 504 may have large portions of the video which have been made and/or are visibly transparent to the user. The creation and/or display of such video-based graphics may only show one feature of the original video, and/or may resemble a vector-based graphic. For example, a video of a race-car may be modified so that only the race-car is visible, while the rest of the video around the car, such as the sky, the road, and the background, is digitally, electronically, and/or otherwise made visibly transparent. However, even though portions of the video-based graphic may appear invisible and/or transparent, the video-based graphic 504 may still have a constant boundary and/or shape, such as rectangular. In these systems, computing and/or processing device may view and/or recognize the video-based graphic as being rectangular. Other variations are possible.

A holder object, such as holder object 506, may be created, imported, and/or otherwise generated, such as by the video pointer aware class. The holder object 506 may be attached to the video-based graphic 504. The holder object 506 may be associated with, mimic, and/or relate to the video-based graphic 504. The holder object 506 may resemble and/or be referred to as a picture frame or a shoebox.

The holder object 506 may have the same dimensions and/or shape as the original video-based graphic 504 and/or a boundary of the video-based graphic 504. For example, the holder object 506 may have the same dimensions as the video-based graphic, but may, for example, be offset by a designated number of pixels, such that the holder object 506 may not be visible to the user. In other systems, the dimensions and/or shape of the holder object 506 may be different.

The holder object 506 may be placed, located, and/or offset from the user's display 402 and/or from the video-based graphic 504. For example, the holder object 506 may be placed, located, and/or offset by a vertical distance H2 from the location of the video-based graphic 504. In some systems, H2 may be configured to be as long or longer than a height of the display 402 and/or the video-based graphic 504, such that at any point within the display 402, the holder object 506 will be placed, located, offset outside of, and/or offstage from the display 402 and/or the vector-based graphic 504. Additionally or alternatively, the holder object 506 may be placed, located, and/or offset by horizontal distance from the video-based graphic. The holder object 506 may be created by the video pointer aware class, or by one or more other components.

Placement of the holder object 506 outside of the display 402 and/or offstage from the video-based graphic 504 may be advantageous in that a processing system and/or other computing device may not need to actually render any images and/or data included in the holder object 506. Various other placements and/or locations of the holder object 506 are possible.

The distance H2 may be the same as the distance H1. In systems where the pointer pixel image 406 is offset by the same amount and/or dimensions as the offset for the holder object 506, the position of the pointer pixel image 406, which may correspond to a position of the pointer 404, may correlate, relate, and/or easily be compared to a position of the holder object 506 and/or video-based graphic 504. In these cases, data in a portion of the holder object 506 may be quickly and easily compared, for example, to the pointer pixel image 406. Various other offsets and/or relationships are possible.

As mentioned, at block 308, video data from the video-based graphic 504, such as video-data (or video pixel images) 521, 522, 523, and 524, may be placed in the holder object 506. The video-based graphic 504 may have one or more pixels, such as pixels 511, 512, 513, and 514, which may make up and/or form the video-based graphic 504. Video data may be, include, and/or be referred to as a video pixel image, a piece of video data, a video data point, and/or a video data set.

The video data (or video pixel images) 521, 522, 523, and 524 about the video-based graphic 504 may be and/or include a collection of data and/or information about all or portions of the video-based graphic 504. For example, the video data may include and/or represent a piece of data for every pixel of the video-based graphic. For example, video data 521 may be about and/or describe the pixel 511, video data 522 may be about and/or describe the pixel 512, video data 523 may be about and/or describe the pixel 513, and/or video data 524 may be about and/or describe the pixel 514. In another example, each video data 521, 522, 523, and 524 may include and/or represent a piece of data for a specified number of pixels, and/or a piece of data for a designated size and/or portion of the video-based graphic. Other examples are possible.

The video data 521, 522, 523, and 524 may be or include various types of data and/or information. For example, the video data 521, 522, 523, and 524 may be or include information and/or data about a transparency and/or opacity ("transparency") of a portion of the video-based graphic 504. Such information and/or data about the transparency may be or include, for example, a transparency value or rating, such as a transparency value set on a scale from 1-100. Alternatively or additionally, in another example, information and/or data about transparency may be or include, for example, an identification of a level, degree, and/or grouping of transparency. For example, each video pixel image 521, 522, 523, and 524 may be or include a designation of either transparent or opaque, such as a transparency designation or an opacity designation. Such designations may, for example, be in the form of a "true" or "false" designation, where "true" may mean that the pixel is transparent (or opaque), and "false" may oppositely mean that the pixel is opaque (or transparent).

For example, a transparency and/or opacity of each piece of video data 521, 522, 523, and 524 in the holder object 506 may be determined. Each piece of video data and/or each pixel in the holder object 506 may be compared, for example, to a threshold, such as a transparency threshold (also referred to as a transparent threshold) or an opacity threshold (also referred to as an opacity threshold or an opaque threshold). An example of a threshold value may be 1%, but greater or smaller threshold values are possible and may be set automatically or by a user. Each piece of video data and/or each pixel may be identified, flagged, and/or labeled as either transparent or opaque based on the comparison. For example, where a pixel has a transparency greater than the transparency threshold, the video data for the pixel may include an identified, such as a "true" or a "1" piece of data, which may indicate that the pixel is transparent. Video data for a pixel which has a transparency less than the threshold may include an identifier, such as a "false" or "0", which may indicate that the pixel is opaque. The true/false and/or 0/1 values may be reversed, with a true or "1" indicating that a pixel is opaque, and a false or "0" indicating that the pixel is transparent.

The transparency threshold may be set automatically or manually. In some systems, the transparency is the same for all video-based graphics. In other systems, such as systems where a user, like an advertiser, may set a transparency for a video-based graphic, like an advertisement, the transparency threshold may vary depending on the advertiser and/or video-based graphic. In some systems, the transparency threshold is set so that only completely transparent pixels will be considered transparent. In other systems, pixels with a certain degree of opacity above or below the transparency threshold will still be considered transparent. Other variations are possible.

In other systems, more than two designations may be possible, such as where three or more levels of transparency may be considered and/or utilized. Other variations and/or types of information and/or data about the transparency of a portion or all of the video-based graphic 504 are possible.

Alternatively or in addition to information and/or data about a transparency of the video-based graphic, other information may be included in the video data 521, 522, 523, and 524. For example, information about a motion and/or change in the video-based graphic and/or in a portion of the video-based graphic may be included in the video data. Various other types of video data are possible.

In some systems, video data 521, 522, 523, and 524 may be gathered directly from the video-based graphic. In other systems, video data may be gathered, analyzed, and/or processed. For example, in some systems, information about a transparency of a pixel of the video-based graphic may first be gathered, then may be compared to one or more threshold values to determine whether or not the transparency is greater than or less than a threshold value. Depending on this comparison, a "true" or "false" designation may be generated as the video data. An example of this may be performed using a hit detection system that may include classes and/or libraries, such as a bitmap hit detection system. Other variations are possible.

Once gathered, determined, and/or processed, the video data 521, 522, 523, and 524 may be placed in the holder object 506. The video data 521, 522, 523, and 524 may be placed in locations in the holder object 506 which may correspond to the pixel or portion of the video-based graphic 504 for which the video data 521, 522, 523, and 524 describes and/or is associated with. For example, video data 521 about pixel 511 may be placed in the top left corner of the holder object 506, corresponding with the placement of the pixel 511 in the video-based graphic 504, and video data 522 about pixel 512, located next to pixel 511, may be placed next to video data 521. Other methods of placement and/or organization of video data 521, 522, 523, and 524 are possible.

In some systems, the video pointer aware class may take a data picture of the video object and/or frame of the video-based graphic 504. The video data 521, 522, 523, and 524 may be a part of a data picture. The data picture may be placed in the holder object 506. The data picture and/or holder object 506 may, in some systems, be created as an invisible representation of the video file, and/or may be offset by the height of the stage as an alpha channeled bitmap. Other variations are possible.

The data picture and/or video data 521, 522, 523, and 524 may be updated, deleted, and/or refreshed at various times and/or under various conditions. For example, the video data 521, 522, 523, and 524 may be refreshed and/or updated for each frame of a video-based graphic 504. Alternatively or in addition, the video data 521, 522, 523, and 524 may be refreshed and/or updated every designated time period, such as once every $\frac{1}{100}$ of a second. Various other updating, deleting, and/or refreshing conditions are possible.

While video data 521, 522, 523, and 524 and the holder object 506 are shown in FIG. 5 as being physically and/or visibly located a distance H1 and H2 from the display 402, it should be appreciated that the video data 521, 522, 523, and 524 and/or holder object 506 may be partially or completely electronic and/or digitally stored and/or saved, such as within memory and/or other processing devices. For example, the data picture and/or video data may be represented as a digital grid of date. By not actually rendering or displaying the video data 521, 522, 523, and 524 and/or holder object 506, resources and computing power may be advantageously saved and/or limited.

Once the holder object 506 has been created and the video data 521, 522, 523, and 524 has been placed in the holder object 506, the method may move to block 309. At block 309, information and/or data regarding a location of the pointer pixel image 406 may be updated. Updating location information and/or data about the pointer pixel image 406 may alternatively be updated only upon a detection of a pointer interaction, and/or at various other times. In some systems, updating information about the pointer pixel image 406 may occur before the video data is placed in the holder object 308. Other variations are possible.

At block 310, the video pointer aware class may determine whether or not a coordinate comparison is possible. A coordinate comparison may be a comparison between a pointer pixel object 406 and video data 521, 522, 523, and 524 stored in a holder object 506. Video data 521, 522, 523, and 524 about the video-based graphic 504 at the location of the pointer pixel image 406 may be compared, analyzed, and/or reviewed, such as to one or more threshold values.

The coordinate comparison may be performed for various reasons, such as to determine a transparency of the video-based graphic 504 at a point corresponding to a pointer 404. This determination may be used, for example, to determine what action to perform, should a user and/or pointer interact with the video-based graphic. For example, if a coordinate comparison indicates that a pointer is on a transparent portion of the video-based graphic when the user and/or pointer interacts with the video-based graphic, actions such as closing the video-based graphic and/or allowing a user to access content underneath the video-based graphic may be performed. If, alternatively, the coordinate comparison indicates that a pointer is on an opaque portion of the video-based graphic when the user and/or pointer interacts with the video-based graphic, actions such as displaying additional information about the video-based graphic or redirecting a user to a different location, web page, or content may be performed. Other variations are possible.

In some circumstances, no coordinate comparison may be possible. For example, in some circumstances, the video data 521, 522, 523, and 524 and/or holder object 506 may be or indicate that the video is completely transparent, and a comparison may not be appropriate and/or possible. In other circumstances, the video-based graphic 504 may end, and therefore there may be no frames left from which to gather video data 521, 522, 523, and 524 to be placed in the holder object 506. As such, no comparison may be possible.

In some systems, no coordinate comparison may be undertaken or otherwise performed when the pointer 404 is not positioned within the video-based graphic 504. For example, in some systems, if the pointer 404 were within the display 402, but outside of the video-based graphic 504, no coordinate comparison may be undertaken. In these systems, a detected user interaction may be interpreted, for example, as an interaction with a transparent portion of the video-based graphic, and/or may be interpreted as a negative or neutral interaction with the video-based graphic.

In some systems, no coordinate comparison may be undertaken or otherwise performed unless a user has interacted with the display 402 and/or video-based graphic 504. In these systems, the method may proceed to step 320 or 322 when no interaction is detected or otherwise identified.

In some systems, one or more rules and/or logic may be used to determine when a comparison is not possible. For example, the system may implement a rule or logic which does not allow for a comparison to be made when a video is entirely transparent and has at least 5 seconds of run-time remaining. In these circumstances, one or more additional or alternative rules may be implemented, such as a rule or logic that if the user interacts with any portion of the video-based additional media, content, and/or additional information, the system may treat the interaction as a favorable interaction (or, alternatively, an unfavorable interaction). Other reasons and methods for not conducting a coordinate comparison and/or determinations regarding coordinate comparisons are possible.

If a coordinate comparison is not possible, the method may move to block 320, where the video data 521, 522, 523, and 524 in the holder object 506 may be erased. Erasing video data 521, 522, 523, and 524 from the holder object 506 where a comparison is not needed may free up resources and memory for various other tasks.

From block 320, the method may move to block 322, where the system may await either a new frame of the video-based graphic 504, or a "kill" or "end" command. Where a new frame of the video-based graphic 504 is received, the method may return to block 308 and proceed as discussed.

A kill command or end command ("kill command") may be a command which ends the video pointer aware class and/or the method of using the video pointer aware class to determine a position of a pointer on a video-based graphic. A kill command may be sent or received automatically, such as when a video-based graphic ends, when a coordinate comparison is not possible, or after a designated number of frames or time period. Alternatively or additionally, the kill command may be sent manually, such by a user.

When a kill command is received at block 322, the method may proceed to block 324. At block 324, the video pointer aware class may be ended and/or terminated. The video pointer aware class and/or system may be shut down and/or powered down until a new event is received, at which point the method may start over again at block 302.

In some methods, the system may remain at block 322 until either a new frame or a kill command is received. In other methods, after a given time, the system may proceed to block 324 after a determined and/or set period of time. In other methods, the system may skip block 322 entirely and move from block 320 back up to block 308. In some methods, the system may only wait for a kill command, or alternatively may only wait for a new frame. In others, the system may wait for whichever of a kill command or new frame is received first.

While block 320 is shown as occurring before block 322, in some methods, block 320 may occur after a kill command is received, but before block 324. Other methods may not have block 320. Other variations are possible.

Returning to block 310, if a coordinate comparison is possible, the method may proceed to block 312. At block 312, the system may conduct the coordinate comparison. The coordinate comparison may be conducted and/or performed in various ways. The video pointer aware class may determine a result of the comparison. Various results of the comparison may be determined and/or established.

Figure 6:
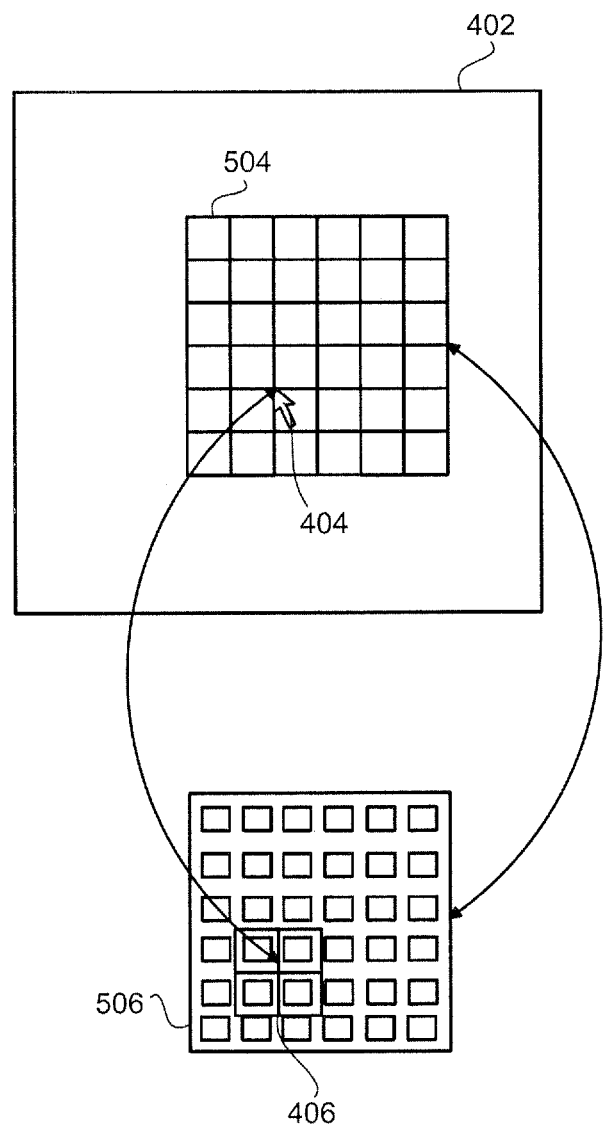
FIG. 6 is a diagram of a video-based graphic, a holder object, and a pointer pixel image.

The coordinate comparison may identify, analyze, and/or determine a position of the pointer 404 in relation to the video-based graphic 504, as shown in FIG. 6. This comparison may be performed, for example, to determine a transparency of the video-based graphic 504 at the position of the pointer 404. This determination may determine whether the pointer is on a transparent or opaque portion of the video-based graphic. In some systems, the video pointer aware class may conduct the coordinate comparison by detecting collisions based on an alpha threshold. The alpha threshold may be adjusted, for example, which may allow for a user to determine what levels of opacity may be considered by the system as a collision or not.

For example, the pointer pixel image 406 may be compared with the video data and/or data picture placed in the holder object 506 at the position of the pointer pixel image 406. The pixels 411, 412, 413, and 414 of the pointer pixel image 406 may correspond to and/or overlap one or more pixels and/or video data about pixels placed in the holder object 506. In some systems, the video pointer aware class may compare each of the pixels 411, 412, 413, and 414 with the video data to see and/or determine whether or not any of the pixels 411, 412, 413, and 414 have the same coordinates as any opaque pixels in the holder object 506.

Where one or more of the pixels 411, 412, 413, and 414 has the same coordinates as at least one of the opaque pixels in the holder object 506, the video pointer aware class may know and/or indicate, such as using a result flag, that the pointer 404 is on an opaque portion of the video-based graphic 504. If not, the video pointer aware class may know and/or indicate, such as using a result flag, that the pointer 404 is on a transparent portion of the video-based graphic 504. In other systems, more than one or all of the pixels 411, 412, 413, and 414 must have the same coordinates as opaque pixels in the holder object 506 in order for the video pointer aware class to know and/or indicate that the pointer 404 is on an opaque portion of the video-based graphic 504. Other variations are possible.

In another example, a transparency of each of the pixels 411, 412, 413, and 414 may first be determined. The transparency of the pointer pixel image 406 may be determined by equating the transparency and/or opacity of the video data in the holder object 506 at the position of the pixels of the pointer pixel image 406 with each respective pixel 411, 412, 413, and 414 of the pointer pixel image 406. The transparency of the pixels 411, 412, 413, and 414 in the pointer pixel image 406 may be compared with the transparency threshold to determine whether the pointer 404 is on a transparent or opaque portion of the video-based graphic 504. In some systems, if one of the pixels 411, 412, 413, and 414 of the pointer pixel image 406 is greater than the transparency threshold, the pointer pixel image 406, or the pointer 404, may be considered to be positioned on a transparent portion of the video-based graphic 504. In other systems, all, or a plurality of the pixels 411, 412, 413, and 414 must be greater than the transparency threshold before the pointer pixel image 406, or the pointer 404, is consider to be positioned on a transparent portion of the video-based graphic 504. Other variations and/or examples are possible.

In other of systems, a sum or compilation of the transparency of the pixels 411, 412, 413, and 414 of the pointer pixel image 406 may be computed and/or calculated. This compilation transparency and/or opacity may be compared to a transparency threshold, with the pointer pixel image 406, or the pointer 404, being considered to be positioned on a transparent portion of the video-based graphic when the compilation transparency is greater than the transparency threshold.

In still other systems, the value of the pixel 411, 412, 413, and 414 with the greatest (or least) transparency of the pointer pixel image 406 may be compared with the transparency threshold. The pointer pixel image may be labeled based on this comparison.

Based on the coordinate comparison in block 312, a result for the pointer pixel image 406 may be calculated, detected, determined, and/or identified. The result may, in some systems, be either true or false. In some systems, a true result indicates that the pointer pixel image 406, or the pointer 404, is located on a transparent portion of the video-based graphic 504, while a false result indicates that the pointer pixel image 406, or the pointer 404, is located on an opaque portion of the video-based graphic 504. It should be noted, however, that the true and false designations may be reversed, and that in other systems, more than two designations may be possible.

The determined result may be flagged and/or otherwise set or identified in blocks 314 and 316. If the determination indicates that the result is true, then the method moves to block 314, where the result is flagged and/or otherwise set to "true." If the determination indicates that the result is false, then the method moves to block 316, where the result is flagged and/or otherwise set to "false."

For example, where a true result indicates that the pointer 404 is one a transparent portion of the video-based graphic 504, and where the determination in block 312 indicates that pointer 404 is on a transparent portion of the video-based graphic 504, the method moves to block 314, where the result is flagged as true. If, however, the determination in block 312 indicated that the pointer is on an opaque portion of the video-based graphic 504, the method moves to block 316, where the result is flagged as false. Other variations are possible.

In some systems, the coordinate comparison and/or determination may be identified, calculated, and/or determined every frame, and/or at designated and/or determined time intervals. In other systems, the coordinate comparison and/or determination may be identified, calculated, and/or determined only when a user interaction is identified and/or detected.

After the result is determined and set in blocks 314 and 316, the method may move to block 318, where the next frame of the video may be considered and/or played. From block 318, the method may proceed back to block 308, and the method may continue as discussed.

The method may include more or less features, and/or may perform one or more actions in different orders or at different times. Various other configurations and orders of operation are possible.

The result, such as from block 314 and/or block 316, may be used at various times and/or for various purposes. For example, the result set in blocks 314 and 316 may be called up, referred to, and/or used, such as at an instant a user or pointer interacts with a video-based graphic 504, to determine whether the user interacted with a transparent or opaque portion of the video-based graphic 504. As another example, the result may be used to determine how to respond and/or what actions to perform in response to a pointer interaction. In another example, the flagged result may be used to determine an image used on a display 402 for a pointer 404. For example, if the result is flagged as true (or false), the pointer 404 may be a hand cursor, and if the result is flagged as false (or true), the pointer 404 may be an arrow cursor. Other actions and responses to the flagged results are possible.

The method of FIG. 3 may provide many advantages. The method may be performed in real-time and/or nearly in real time. The method may not be very CPU intensive or RAM intensive, and may therefore be an efficient and minimal use of processing resources. The method may track the location of a pointer, such as a mouse, in real time, and may determine whether or not the mouse is over a transparent or opaque pixel of a video-based graphic. The method may be event driven, and may not require specific timing to initialize, run, and/or stop or shutdown.

Figure 7:
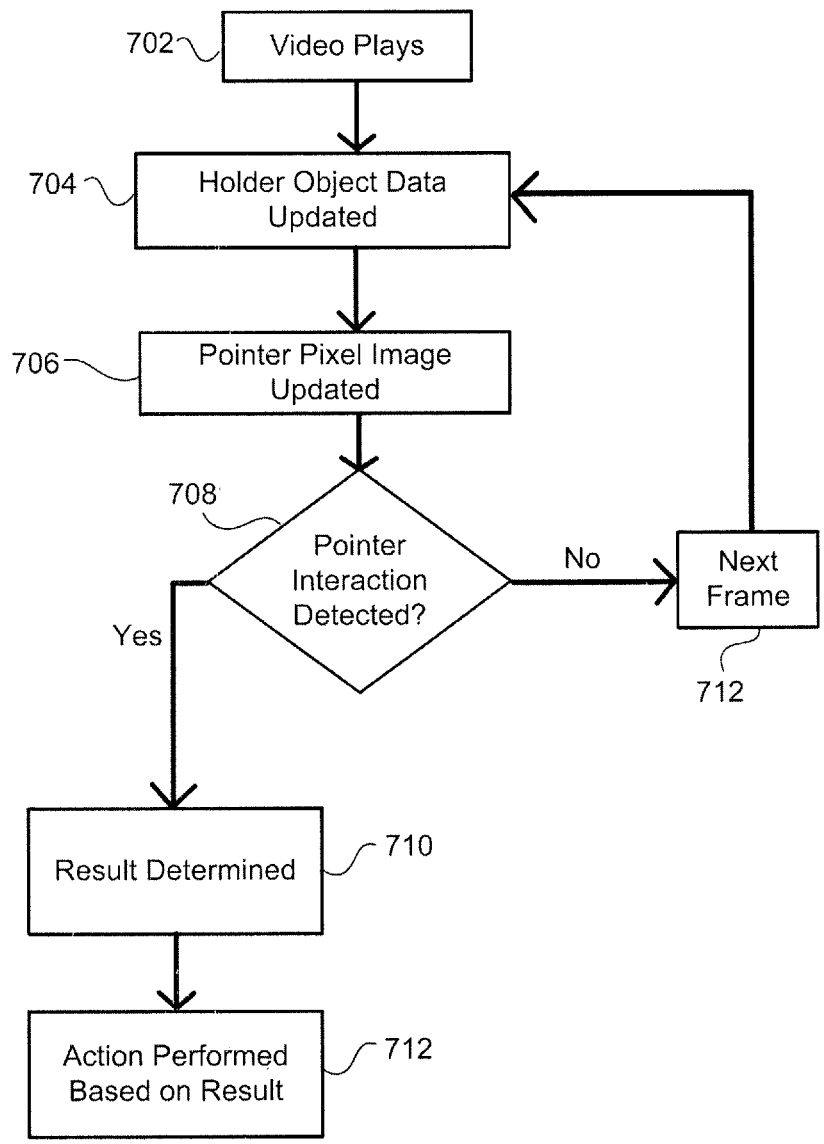
FIG. 7 is a flow diagram of a method of using a video pointer aware class with the display of a video-based graphic.

For example, FIG. 7 illustrates a method of serving and monitoring a video viewed by a user. The method begins at block 702, where a video is being played. The video may, for example, be video-based graphic, such as an animated advertisement, served over content requested by a user. The video may, alternatively or in addition, be various other videos.

The method of FIG. 7 may take place at various points during the playing of a video, such as after a video class has been initialized, a pointer pixel image 406 created, and/or a holder object created 506. The method may take place at various other times and points during the playing of a video.

At block 704, holder object data, such as a data picture and/or video data 521, 522, 523, and 524 in the holder object 506, may be updated. In some methods, this may be similar to, or the same as, block 308 of the method in FIG. 3. The video data, data picture, and/or other data about a video playing may be updated at various times and/or under various conditions, such as every frame of the video and/or at various time intervals. The video data or frame data may be data about a first frame of the video during a first iteration of the loop between blocks 704, 706, 708, and 712. In some systems, during successive iterations of this loop, a successive frame of the video may be used for each step of the method.

At block 706, the pointer pixel image may be updated. Updating the pointer pixel image 406 may be or include updating a position or location of the pointer pixel image 406 and/or the pixels 411, 412, 413, and 414 of the pointer pixel image 406. In some systems or methods, this may include updating a transparency of the pointer pixel image 406 and/or of the pixels 411, 412, 413, and 414.

At block 708, the system may determine whether or not a pointer interaction, such as a mouse click with a video-based graphic, is detected. Where no interaction is detected, the method may proceed to block 712, where the next frame of the video is obtained and/or used. After block 712, the method may return to block 704.

In some methods, blocks 704, 706, 708, and 712 may resemble, be equivalent to, and/or include or be included within one or more of blocks 308, 310, 312, 314, 316, 318, 320, and 322 of the method of FIG. 3. In some methods, blocks 704, 706, 708, and/or 712 may be performed in various orders. For example, in some methods, a pointer pixel image 406 may be updated before a holder object data is updated. Other variations are possible.

If, at block 708, a pointer interaction is detected, the method may proceed to block 710, where a result is determined and/or flagged or otherwise set. The result may indicated a transparency (or opacity) of a portion of the video-based graphic 504 at the location of the pointer 404. The result may be determined in various manners, such as those discussed with respect to blocks 312, 314, and 316 in the method in FIG. 3.

In some systems, the result may be determined by looking up a value for the result. For example, a value for the result may be set during each frame or during a given time period, such as in blocks 314 or 316 of the method of FIG. 3. Determining the result may merely require looking up the value of the result, such as the values from blocks 314 or 316. In other systems, a coordinate comparison, such as the coordinate comparison of block 312 of the method of FIG. 3, may only be conducted upon a pointer interaction. In these systems, determining the result in block 710 may require conducting a coordinate comparison and determining a result, such as in block 312 as previous described. Various other variations are possible.

The result may, in some systems, be a true or false, or binary result, as previously described. In other systems, three or more results may be possible, and the result may be one of three or more results, such as one of three or more levels of transparency. In other systems, the result may be a value, such as a value from 1-100 of a transparency. Various other variations are possible.

After the result has been determined, the method may move to block 712, where an action may be performed based on the result. The specific action to be performed may be partially or completely tied to the result from block 710. Different actions may be performed based on different results that are determined.

For example, if the result indicates that the pointer interaction occurred over an opaque portion of a video-based graphic, such as a click on a race car in a video-based advertisement, a first action may be taken. Alternatively, if the pointer interaction occurred over a transparent portion of the video-based graphic, such as above the race car on a sky portion of a video-based advertisement that was made to be visually transparent to the user, a second action may be taken. In other examples, more than two different results may be possible, and more than two different actions may be performed, depending upon which of the more than two different results were determined.

Various actions may be taken. A result which indicates that the pointer 404 is over an opaque portion of a video-based graphic 504 may cause, prompt, or result in additional information and/or data about or related to the video-based graphic 504 or sponsor of the graphic 504 to be retrieved, gathered, assembled, and/or displayed to the user. In some systems, this additional information may include web sites, videos, graphics, animations, images, text, and/or other pages or data that may be displayed. The additional information may be displayed, for example, over the content requested by a user. The additional information may be or include the opening of a new window or tab with a web page displayed. The additional information may include and/or be displayed in the form of a redirection of the user from the content requested to a web page of the advertiser. Various other actions and/or types of additional information may be displayed when a user interacts with an opaque portion of a video-based graphic.

A result which indicates that the pointer 404 is over a transparent portion of a video-based graphic 504 may cause, prompt, or result in one or more actions. For example, the video-based graphic 504 may disappear and/or be closed. Additionally or alternatively, the user may be given access to and/or be able to scroll or otherwise view and/or interact with content below, behind, underlying, and/or not otherwise obstructed by the video-based graphic 504.

In some systems, the result may be flagged and/or determined during each frame of a video-based graphic. The result may be used, for example, to determine an image for a cursor, such as an arrow image or a hand image. When a pointer interaction occurs within the display 402, an action may be performed, for example, based on the image of the cursor. If the image is an arrow, one action, such as closing the video-based graphic, may be performed, while if the image is a hand, a second action, such as redirecting the user to a new web page, may be performed. Other variations and possible actions are possible.

The video pointer aware class may, for example, be a video mouse aware class, or may be various other video pointer aware classes. The video mouse aware class may be used to identify a position of a mouse pointer on a display that is displaying or playing a video-based graphic.

Figure 8:
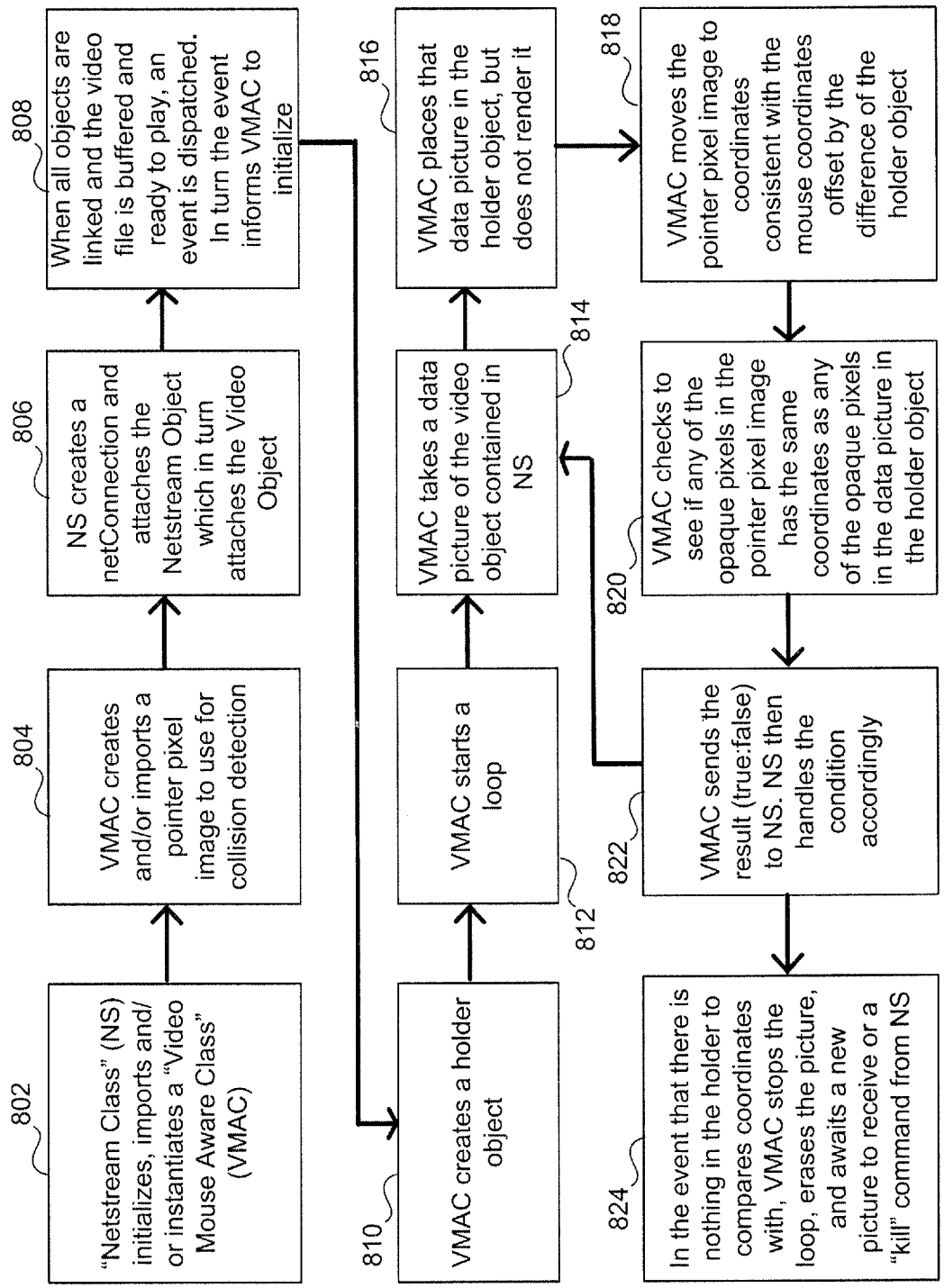
FIG. 8 is a flow diagram of a method of using a video pointer aware class with the display of a video-based graphic.

FIG. 8 depicts a method of creating, incorporating, and using a video mouse aware class. The method may begin at block 802, where a Netstream class, such as a custom Netstream class, initializes a video mouse aware class. Initializing the video mouse aware class may be similar to, the same as, and/or include portions or all of the initialization of the video pointer aware class in block 304 in the method of FIG. 3. The Netstream class may also import and/or instantiate the video mouse aware class. Initialization of the video mouse aware class may be prompted by the recognition and/or identification of a video file and/or video-based graphic, such as a flash file, to be played.

After block 802, the method may move to block 804, where the video mouse aware class may create and/or import a pointer pixel image 406. The pointer pixel image 406 may be a 2×2 pixel image, or may be another image. The pointer pixel image 406 may be created and/or imported in various ways, such as in the ways discussed above, such as with respect to block 305 of the method in FIG. 3.

The method may move to block 806, where the Netstream class may create a netConnection. Creation of the netConnection may, in some systems, be the same as, similar to, and/or include part or all of the features of the creation of the netConnection Objection created in block 202 in the method of FIG. 2. Other variations are possible.

In block 806, the Netstream class may attach the netConnection to the Netstream object. This attachment may be the same as, similar to, and/or include part or all of the features of block 204 in the method of FIG. 2. Other variations are possible.

Also in block 806, the Netstream object may attach to the video object. This attachment may be the same as, similar to, and/or include part or all of the features of block 206 in the method of FIG. 2. Various other variations are possible.

At block 808, the method may check and/or determine whether all objects, such as the Netstream object and the video object, are linked. The method may also check and/or determine whether the video file is buffered. The determination of whether the video file is buffered may be similar to, the same as, and/or include part of or all of the features in block 210 in the method of FIG. 2. When the video is ready to play, an event may be dispatched, such as the event dispatched in block 212 of FIG. 2. The event may inform the video mouse aware class of the playing of the video, and/or may request and/or cause the video mouse aware class to initialize. Various other configurations and/or features are possible.

The method may proceed to block 810, where the video mouse aware class may create a holder object 506. The holder object 506 may be created outside of the viewable area of a video, such as outside the viewable area of a flash file or other video-based graphic 504. Creation of the holder object 506 may resemble, be the same as, and/or include the steps of the creation of the holder object 506 discussed in block 306 of the method of FIG. 3. Various other ways of creating the holder object 506 may be possible.

The method may proceed to block 812, where the video mouse aware class may start a loop. The loop may, for example, include one or more of the blocks 814, 816, 818, 820, and/or 822. The loop may have a cycle which may be consistent with, and/or mimic a frame rate, such as frame rate of the video played. Other rates are possible.

At block 814, the video mouse aware class may take a data picture of the video object contained in the Netstream class. The data picture may, for example, contain and/or include video data, such as video data 521, 522, 523, and 524. The data picture may include data about the video. Other examples of a data picture are possible.

At block 816, the video mouse aware class may place the data picture in the holder object 506. As mentioned, the holder object 506 may be located offstage and/or offset from the video-based graphic 504 and/or the display 402. The video mouse aware class may not render the data picture that was taken. Rather, because the data picture is placed in a holder object 506 offstage and/or offset from the display 402 and/or the video-based graphic 404, no processing, memory, and/or other computer power may be required for rendering an image. The features in blocks 814 and 816 may be the same as, similar to, and/or include part or all of the features in block 308 of the method in FIG. 3. Other variations are possible.

At block 818, the video mouse aware class may move the pointer pixel image 406 to coordinates that may be consistent with the mouse coordinates, offset by a given distance H1. The distance H1 may be the same distance that the holder object 506 has been offset from the display 402 and/or video-based graphic 504. Movement of the pointer pixel image 406 may include updating information about the pointer pixel image 406, such as the updating of pointer pixel image 406 performed in block 309 of the method in FIG. 3.

At block 820, the video mouse aware class may check to see if any of the opaque pixels in the pointer pixel image 406 has the same coordinate as any of the opaque pixels in the data picture in the holder object 506. In this way, the video mouse aware class may determine whether or not the pointer 404 is on an opaque or transparent portion of the video-based graphic 504. The features of block 820 may resemble the determination of the result in block 312 of the method in FIG. 3. Other variations are possible.

At block 822, the video mouse aware class may send a result, such as true or false, to the Netstream class. The Netstream class may then handle the condition accordingly. For example, the Netstream class may hold the result until a user interaction is determined, at which point the Netstream class may use the result to determine a response and/or action to be performed. In another example, the Netstream class may inform the pointer 404 to become change appearances depending on the result, such as to display a hand when the pointer 404 is over an opaque (or transparent) portion of the video-based graphic, and to display an arrow when the pointer 404 is over a transparent (or opaque) portion of the video-based graphic. The features of block 822 may be the same as, similar to, and/or include part or all of the features of blocks 314 and 316 of the method in FIG. 3, and/or the features in blocks 710 and 712 of the method in FIG. 7. Other variations are possible.

After block 822, the method may return to block 814, where the loop may continue. From block 822, the method may proceed to block 824 when there is nothing in the holder object 506 to compare coordinates with. Reasons for this may be the same as, similar to, and/or include part or all of the reasons for moving to block 320 described in the method in FIG. 3, or various other reasons. In block 824, the video mouse aware class may stop the loop and erase the data picture from the holder object 506. This may be the same as, similar to, and/or include part or all of the features of block 320 from the method in FIG. 3.

In block 824, the video mouse aware class may then await a new picture to receive and/or a "kill" command from the Netstream class. This may be the same as, similar to, and/or include part or all of the features in block 322 of the method in FIG. 3, as previous discussed. Various other methods and configurations are possible.

While the above described systems and methods may refer to a transparency, in some systems and methods, opacity may be used as well. Where a threshold, level, and/or value of a transparency are described, it should be appreciated that an opacity threshold, level, and/or value may also be used. In some systems, transparency may be replaced by translucency. In addition, while the above described systems and methods may be used to determine and/or control systems based on a transparency or opacity of a video-based graphic, these systems and methods may also be applied with determining and/or controlling systems based on other features and/or properties of a video-based graphic, such as, for example, a color of the video-based graphic, color types of the video-based graphics, color combinations of the video-based graphics, average colors per designated number of pixels, and/or various other properties of the video-based graphics.

While the above described methods and systems may refer to a comparison and/or determination as to whether one element is greater than or equal to a second element, in some embodiments one or more of these comparisons may be replaced by a comparison and/or determination as to whether one element is greater than a second element. Similarly, comparisons and/or determinations described as being "greater than" may also be replaced with "greater than or equal to." While the above described methods may refer to a comparison and/or determination as to whether one element is less than or equal to a second element, in some embodiments one or more of these comparisons may be replaced by a comparison and/or determination as to whether one element is less than a second element. Similarly, comparisons and/or determinations described as being "less than" may also be replaced with "less than or equal to." Comparisons and/or determinations made which require an element to "exceed" a second element may be replaced by comparisons and/or determinations which require an element to "exceed or equal" a second element, and vice versa.

Figure 9:
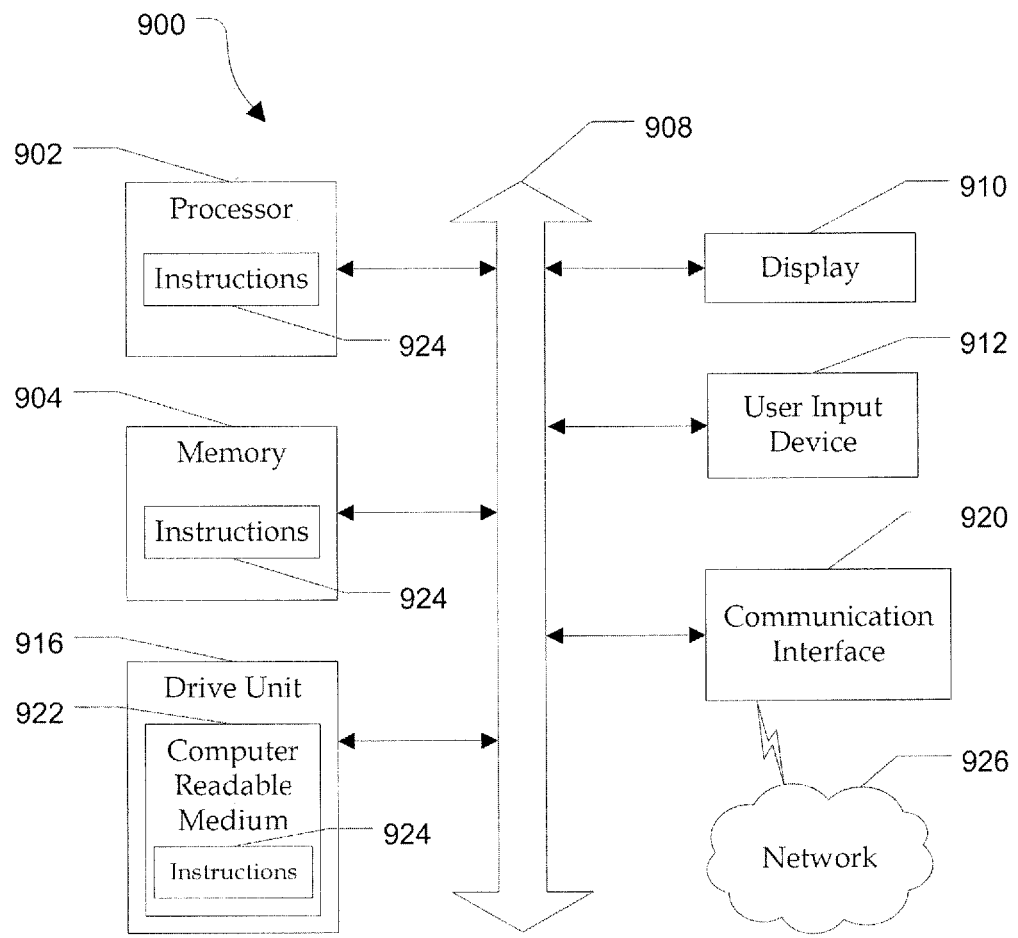
FIG. 9 is a processing system for use with creating and operating a video pointer aware class.

The content system 140, client applications 115, 125A-125N, online providers, video pointer aware classes, and/or Netstream classes may be or include part or all of one or more computing devices of various kinds, such as the computing device in FIG. 9. In some systems, the video pointer aware classes and/or Netstream classes may be a part of, included in, controlled by, and/or otherwise operated or manipulated using client applications 125A-125N.

FIG. 9 illustrates an embodiment of a general computer system designated 900. Various components from the described systems, such as the web application 125A, the standalone applications 115, 125B, the mobile application 125N, the video pointer aware class, and/or the content system 140, may be or include part or all of the computer system 900.

The computer system 900 can include a set of instructions that can be executed to cause the computer system 900 to perform any one or more of the methods or computer based functions disclosed herein. The computer system 900 may operate as a standalone device or may be connected, e.g., using a network, to other computer systems or peripheral devices.

In a networked deployment, the computer system 900 may operate in the capacity of a server or as a client user computer in a server-client user network environment, or as a peer computer system in a peer-to-peer (or distributed) network environment. The computer system 900 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 900 may be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 may include a processor 902, e.g., a central processing unit (CPU), a graphics processing unit (GPU), or both. The processor 902 may be a component in a variety of systems. For example, the processor 902 may be part of a standard personal computer or a workstation. The processor 902 may be one or more general processors, digital signal processors, application specific integrated circuits, field programmable gate arrays, servers, networks, digital circuits, analog circuits, combinations thereof, or other now known or later developed devices for analyzing and processing data. The processor 902 may implement a software program, such as code generated manually (i.e., programmed).

The computer system 900 may include a memory 904 that can communicate via a bus 908. The memory 904 may be a main memory, a static memory, or a dynamic memory. The memory 904 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 904 includes a cache or random access memory for the processor 902. In alternative embodiments, the memory 904 may be separate from the processor 902, such as a cache memory of a processor, the system memory, or other memory. The memory 904 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 904 may be operable to store instructions executable by the processor 902. The functions, acts or tasks illustrated in the figures or described herein may be performed by the programmed processor 902 executing the instructions stored in the memory 904. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 900 may further include a display unit 910, such as a liquid crystal display (LCD), an organic light emitting diode (OLED), a flat panel display, a solid state display, a cathode ray tube (CRT), a projector, a printer or other now known or later developed display device for outputting determined information. The display 910 may act as an interface for the user to see the functioning of the processor 902, or specifically as an interface with the software stored in the memory 904 or in the drive unit 916.

Additionally, the computer system 900 may include an input device 912 configured to allow a user to interact with any of the components of system 900. The input device 912 may be a number pad, a keyboard, or a cursor control device, such as a mouse, or a joystick, touch screen display, remote control or any other device operative to interact with the computer system 900.

In a particular embodiment, as depicted in FIG. 10, the computer system 900 may also include a disk or optical drive unit 916. The disk drive unit 916 may include a computer-readable medium 922 in which one or more sets of instructions 924, e.g. software, can be embedded. Further, the instructions 924 may embody one or more of the methods or logic as described herein. In a particular embodiment, the instructions 924 may reside completely, or at least partially, within the memory 904 and/or within the processor 902 during execution by the computer system 900. The memory 904 and the processor 902 also may include computer-readable media as discussed above.

A computer-readable medium may include instructions 924 and/or receive and execute instructions 924 responsive to a propagated signal so that a device connected to a network 926 can communicate voice, video, audio, images or any other data over the network 926. Further, the instructions 924 may be transmitted or received over the network 926 via a communication port or interface 920, and/or using a bus 908. The communication port or interface 920 may be a part of the processor 902 or may be a separate component. The communication port 920 may be created in software or may be a physical connection in hardware. The communication port 920 may be configured to connect with a network 926, external media, the display 910, or any other components in system 900, or combinations thereof. The connection with the network 926 may be a physical connection, such as a wired Ethernet connection or may be established wirelessly as discussed below. Likewise, the additional connections with other components of the system 900 may be physical connections or may be established wirelessly. The network 926 may alternatively be directly connected to the bus 908.

The network 926 may include wired networks, wireless networks, or combinations thereof. The wireless network may be a cellular telephone network, an 802.11, 802.16, 802.20, or WiMax network. Further, the network 926 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed herein. The "computer-readable medium" may be non-transitory, and may be tangible.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The systems and methods described may provide many advantages. For example, the use of a video pointer aware class may allow online providers, content providers, and/or marketers and advertisers to use video-based graphics in the same or a similar manner as vector-based graphics. Users may be unable to distinguish between a functionality of video-based graphics and vector-based graphics, while it may be easier, less computation intensive, and more efficient for programmers and developers to develop video-based graphics. Computing and/or processing power and resources may be saved and/or efficiently managed, and may not be needed to actually render or display creations of the video pointer aware class, such as the holder object 506 and video data within the holder object 506. The system may be invisible to the end user while being pertinent to advertisers and online providers. As such, running the video pointer aware class may not require significant processing resources. Various other advantages are possible.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A method comprising:
    displaying, with a display device, a video-based graphic, wherein the video-based graphic is displayed within an area on the display device, and wherein the video-based graphic, in being displayed within the area on the display device, includes at least a transparent portion that is at least partially transparent such that content displayed behind the transparent portion of the video-based graphic is at least partially visible, and an opaque portion that is opaque such that content displayed behind the opaque portion of the video-based graphic is not visible;
    displaying, with the display device, other content, the other content at least partially displayed behind the video-based graphic;
    receiving, by a processor, a pointer interaction with the video-based graphic;
    determining, by the processor, a location of the pointer interaction with the video-based graphic;
    determining, by the processor, an opacity designation of a pixel of the video-based graphic at a location of the video-based graphic corresponding to the location of the pointer interaction;
    determining whether the opacity designation of the pixel of the video-based graphic corresponds to one of a positive interaction or a negative interaction with the video-based graphic; and
    providing an interaction with the other content that is displayed with the display device behind the video-based graphic in response to determining that the opacity designation of the pixel of the video-based graphic corresponds to the positive interaction or the negative interaction with the video-based graphic.

2. The method of claim 1, wherein determining that the opacity designation of the pixel of the video-based graphic corresponds to the positive interaction or the negative interaction with the video-based graphic further comprises determining whether the opacity designation of the pixel indicates that the pixel is more opaque than an opacity threshold.

3. The method of claim 1, wherein the providing the interaction with the other content displayed with the display device behind the video-based graphic further comprises enabling at least one of viewing, scrolling, or clicking, and one of opening or closing the video-based graphic.

4. The method of claim 1, further comprising:
    displaying, with the display device, additional information related to the video-based graphic in response to determining that the opacity designation of the pixel of the video-based graphic corresponds to one of the positive interaction or the negative interaction with the video-based graphic.

5. The method of claim 1, further comprising:
    identifying a distinction between transparent and opaque pixels in the video-based graphic as a pointer aware class to monitor the pointer interaction with the video-based graphic.

6. The method of claim 5, further comprising:
    using the pointer aware class to determine a position of the pointer interaction via coordinates comparison at an opaque portion of the video-based graphic.

7. The method of claim 6, wherein the coordinates comparison comprises determining a position of the pointer interaction in relation to the video-based graphic to determine the opacity designation of the video-based graphic at the position of the pointer interaction.

8. An apparatus comprising:
    a display device configured to at least:
        display a video-based graphic, wherein the video-based graphic is displayed within an area of the display device, and wherein the video-based graphic, in being displayed within the area on the display device, includes at least a transparent portion that is at least partially transparent such that content displayed behind the transparent portion of the video-based graphic is at least partially visible, and an opaque portion that is opaque such that content displayed behind the opaque portion of the video-based graphic is not visible; and
        display other content on the display device, the other content at least partially displayed behind the video-based graphic;
    a user input device; and
    a processor coupled to the display device and the user input device, the processor configured to at least:
        receive a pointer interaction with the video-based graphic via the user input device;
        determine a location of the pointer interaction with the video-based graphic;
        determine an opacity designation of a pixel of the video-based graphic at a location of the video-based graphic corresponding to the location of the pointer interaction;

determine whether the opacity designation of the pixel of the video-based graphic corresponds to one of a positive interaction or a negative interaction with the video-based graphic; and provide access, in addition to viewing of the other content underneath the video-based graphic, to the other content behind the video-based graphic and displayed with the display device in response to determining that the opacity designation of the pixel of the video-based graphic corresponds to the positive interaction or the negative interaction with the video-based graphic.

9. The apparatus of claim 8, wherein the processor is configured to determine that the opacity designation of the pixel of the video-based graphic corresponds to the positive interaction or the negative interaction with the video-based graphic by determining whether the opacity designation of the pixel indicates that the pixel is more opaque than an opacity threshold.

10. The apparatus of claim 8, wherein the processor is configured to provide access to the other content displayed with the display device by enabling at least one of viewing, scrolling, or interacting with the other content, and opening or closing the video-based graphic.

11. The apparatus of claim 8, wherein the processor is further configured to at least:
display, via the display device, additional information related to the video-based graphic in response to determining that the opacity designation of the pixel of the video-based graphic corresponds to one the positive interaction or the negative interaction with the video-based graphic.

12. The apparatus of claim 8, wherein the processor is further configured to at least identify a distinction between transparent and opaque pixels in the video-based graphic as a pointer aware class to monitor the pointer interaction with the video-based graphic.

13. The apparatus of claim 12, wherein the processor is further configured to at least use the pointer aware class to determine a position of the pointer interaction via coordinates comparison at an opaque portion of the video-based graphic.

14. The apparatus of claim 13, wherein the coordinates comparison determines a position of the pointer interaction in relation to the video-based graphic to determine the opacity designation of the video-based graphic at the position of the pointer interaction.

15. A non-transitory computer-readable storage medium including computer executable instructions, wherein the instructions when executed by a processor, configures the computer to monitor a video-based graphic by performing steps, comprising:
displaying, with a display device, a video-based graphic, wherein the video-based graphic is displayed within an area on the display device, and wherein the video-based graphic, in being displayed within the area on the display device, includes at least a transparent portion that is at least partially transparent such that content displayed behind the transparent portion of the video-based graphic is at least partially visible, and an opaque portion that is opaque such that content displayed behind the opaque portion of the video-based graphic is not visible;

displaying, with the display device, other content, the other content at least partially displayed behind the video-based graphic;

receiving, by the processor, a pointer interaction with the video-based graphic;

determining, by the processor, a location of the pointer interaction with the video-based graphic;

determining, by the processor, an opacity designation of a pixel of the video-based graphic at a location of the video-based graphic corresponding to the location of the pointer interaction;

determining whether the opacity designation of the pixel of the video-based graphic corresponds to one of a positive interaction or a negative interaction with the video-based graphic; and providing an interaction with a portion of the other content behind the video-based graphic in response to determining that the opacity designation of the pixel of the video-based graphic corresponds to the positive interaction or the negative interaction with the video-based graphic.

16. The non-transitory computer-readable storage medium of claim 15, wherein the determining that the opacity designation of the pixel of the video-based graphic corresponds to the positive interaction or the negative interaction with the video-based graphic further comprises determining whether the opacity designation of the pixel indicates that the pixel is more opaque than an opacity threshold.

17. The non-transitory computer-readable storage medium of claim 15, wherein the providing the interaction with the portion of the other content obstructed by the video-based graphic further comprises enabling at least one of viewing, scrolling, or clicking, and opening or closing the video-based graphic.

18. The non-transitory computer-readable storage medium of claim 15, wherein the computer performing:
displaying, with the display device, additional information related to the video-based graphic in response to determining that the opacity designation of the pixel of the video-based graphic corresponds to one of the positive interaction or the negative interaction with the video-based graphic.

19. The non-transitory computer-readable storage medium of claim 15, wherein the computer further performing:
identifying a distinction between transparent and opaque pixels in the video-based graphic as pointer aware class to monitor the pointer interaction with the video-based graphic.

20. The non-transitory computer-readable storage medium of claim 19, wherein the computer further performing:
using the pointer aware class to determine a position of the pointer interaction via coordinates comparison at an opaque portion of the video-based graphic.

21. The non-transitory computer-readable storage medium of claim 20, wherein the coordinates comparison determines a position of the pointer interaction in relation to the video-based graphic to determine the opacity designation of the video-based graphic at the position of the pointer interaction.

* * * * *